United States Patent [19]
Jodoin et al.

[11] Patent Number: 5,089,908
[45] Date of Patent: Feb. 18, 1992

[54] PLYWOOD SUPPRESSION IN ROS SYSTEMS

[75] Inventors: Ronald E. Jodoin, Pittsford; Robert P. Loce, Rochester; William L. Lama, Webster; James D. Rees, Pittsford, all of N.Y.; Abd-El-Fattah A. Ibrahim, Palos Verdes Estate, Calif.; James J. Appel, Brighton, N.Y.

[73] Assignee: Xerox Corporation, Stamford, Conn.

[21] Appl. No.: 735,664

[22] Filed: Jul. 26, 1991

Related U.S. Application Data

[63] Continuation of Ser. No. 546,214, Jun. 29, 1990, abandoned.

[51] Int. Cl.$^5$ ............................................. G02B 26/08
[52] U.S. Cl. ................... 359/212; 359/216; 359/618; 250/236; 250/578.1; 346/108
[58] Field of Search ............ 350/6.5, 6.1, 6.7, 6.8, 350/169; 430/73, 56; 204/192.26; 346/108; 358/302; 354/1; 250/578.1, 235, 236

[56] References Cited

U.S. PATENT DOCUMENTS

| | | | |
|---|---|---|---|
| 4,157,215 | 6/1979 | Hanak | 354/1 |
| 4,253,102 | 2/1981 | Kataoka et al. | 346/108 |
| 4,420,761 | 12/1983 | Kitamura | 346/108 |
| 4,445,125 | 4/1984 | Scifres et al. | 346/108 |
| 4,588,667 | 5/1986 | Jones et al. | 430/73 |
| 4,618,552 | 10/1986 | Tanaka et al. | 430/60 |
| 4,725,131 | 2/1988 | Goodwin et al. | 359/639 |
| 4,796,964 | 1/1989 | Connell et al. | 359/217 |

Primary Examiner—Loha Ben

[57] ABSTRACT

A multiple diode laser array used in a ROS scanning system is modified to reduce the effects of undesirable spatial exposure variation at the surface of certain type of layered, semi-transparent photoreceptors. The spatial absorption variation is later manifested as a "plywooding" pattern formed on output prints derived from the exposed photoreceptor. The laser array is modified to form a merged scanning beam at the photoreceptor surface of two or more diode outputs, each output operating at a different wavelength than the other. In one embodiment, a plurality of diodes, each at a different wavelength, are sequentially addressed, and an image of each diode is scanned across the photoreceptor which results in an exposure distribution that would be similar to that formed by an incoherent beam.

4 Claims, 4 Drawing Sheets

Position Across PR ⟶

Position #   1    2    3    4    5    6    7    8    9

Time t1

Time t2

Time t3

Time t4

Time t5

PLYWOOD SUPPRESSION IN ROS SYSTEMS

This is a continuation of application Ser. No. 07/546,214, filed June 29, 1990, now abandoned.

BACKGROUND AND PRIOR ART STATEMENT

The present invention relates to an imaging system which uses coherent light radiation to expose a layered photosensitive member in an image configuration and, more particularly, to a means and method for suppressing optical interference variations occuring within the photosensitive member which results in a plywooding type of defect in output prints derived from the exposed photosensitive member.

There are numerous applications in the electrophotographic art wherein a coherent beam of radiation, typically from a helium-neon or diode laser, is modulated by an input imaging data signal. The modulated beam is directed (scanned) across the surface of a photosensitive medium such as a photoreceptor drum or belt, or a photosensitive film. Certain classes of photosensitive medium which can be characterized as "layered photoreceptors" have at least a partially transparent layer, referred to as the charge transport layer overlying a charge carrier generation layer and a conductive ground plane. A problem inherent in using these layered photoreceptors, depending upon their physical characteristics, is the creation of two dominant reflections of the incident coherent light on the photoreceptor, e.g., a first reflection from the top surface and a second reflection from the ground plane surface. This condition is shown in FIG. 1 which shows coherent rays 1 and 2 incident on a layered photoreceptor 6 comprising a charge transport layer 7, charge generator layer 8, and a ground plane 9. There are two dominant reflections, one from the top surface of layer 7, and one from the ground plane 9. Depending on the optical path difference as determined by the thickness and index of refraction of layers 7, and 8, rays 1 and 2 can interfere constructively or destructively when they combine to form beam 3. When the additional optical path traveled by ray 1 (dashed rays) is an integer multiple of the wavelength of the light, constructive interference occurs at the top surface, more light exits transport layer 7 and hence less is absorbed within charge generator layer 8 upon subsequent internal reflections. Conversely, a path difference producing destructive interference at the top surface means more light stays in the layer, and more absorption occurs in charge generator layer 8. The difference in absorption in the charge generator layer 8, typically due to layer thickness variations within charge transport layer 7, is equivalent to a spatial variation in exposure on the surface. This spatial exposure variation present in the image formed on the photoreceptor becomes manifest in the output print derived from the exposed photoreceptor. FIG. 2 shows the areas of spatial density variation (at 25×) formed on a print when using a photoreceptor of the type shown in FIG. 1 and when illuminated by a He-Ne laser with an output wavelength of 633 nm. A similar variation is present when exposure is by a diode laser. The pattern of light and dark interference fringes look like the grains on a sheet of plywood. Hence the term "plywood effect" is generically applied to this problem.

One method of compensating for the plywood effect known to the prior art is to increase the thickness of, and hence the absorption of, the light by the charge generator layer. For most systems, this leads to unacceptable tradeoffs; for example, for a layered organic photoreceptor, an increase in dark decay characteristics and electrical instability may occur. Another method disclosed in U.S. Pat. No. 4,618,552 is to use a photoconductive imaging member in which the ground plane, or an opaque conductive layer formed above or below the ground plane, is formed with a rough surface morphology to diffusely reflect the light. A third method, disclosed in copending application U.S. Ser. No. 07/523,639, filed on May 15, 1990, now U.S. Pat. No. 5,051,328, and assigned to the same assignee as the present invention, is to form the ground plane of a low reflection material so as to reduce the reflections therefrom.

According to the general principles of the present invention, the plywood effect problem is addressed by using two or more coherent light sources of different wavelengths, and by combining their outputs so as to form a single incoherent scanning beam or two adjacent beams at the photoreceptor. In a first embodiment, a plurality of IR diodes formed as a linear array have their outputs merged into a single scanning beam at an imaging plane. Each of the diodes is operated at a different wavelength to obtain an essentially incoherent beam. In a second aspect of the invention, two optimum output wavelengths are prescribed so that absorptance maxima of one and minima of the other coincide. In a still further extension of the present invention, a linear array of diodes of differing wavelengths are sequentially addressed to achieve a uniform integrated absorption distribution at the photoreceptor surface.

More particularly, the present invention relates to a light scanning system comprising:

a photosensitive image recording member comprising at least a transparent photoconductive charge transport layer overlying a charge generator layer and a conductive ground plane, a diode laser array including a plurality of diodes, each diode operating at a different output wavelength, means for supplying video signal information to the diodes to provide for emission of a plurality of light beams from the array with each of the light beams modulated in accordance with the video signal information and at the characteristic wavelength, optical means for focusing the plurality of light beams to form a merged beam, or adjacent beams, at the surface of the recording member, and scanning means for scanning the light beam across the linear portion of the image recording member surface, wherein the merged multi-wavelength scan beam is almost uniformly absorbed within the layers.

While it is known in the art to combine laser beam outputs from multiple laser sources to achieve higher power outputs (see U.S. Pat. No. 4,725,131), it has not previously been known to combine multiple laser sources with different wavelengths for the purpose of eliminating plywooding effects in a layered photosensitive image surface.

DESCRIPTION OF THE INVENTION

Figure 1:
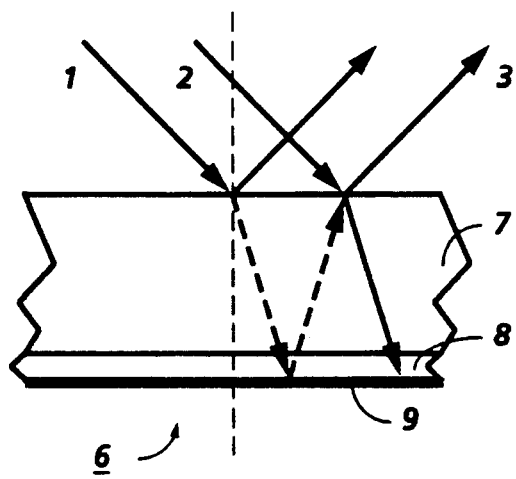
FIG. 1 shows coherent light incident upon a prior art layered photosensitive medium leading to reflections internal to the medium.
Figure 2:
FIG. 2 shows a spatial density variation pattern of a print from an exposed photosensitive medium of FIG. 1 when the spatial variation in the absorption within the member occurs due to an interference effect.
Figure 3:
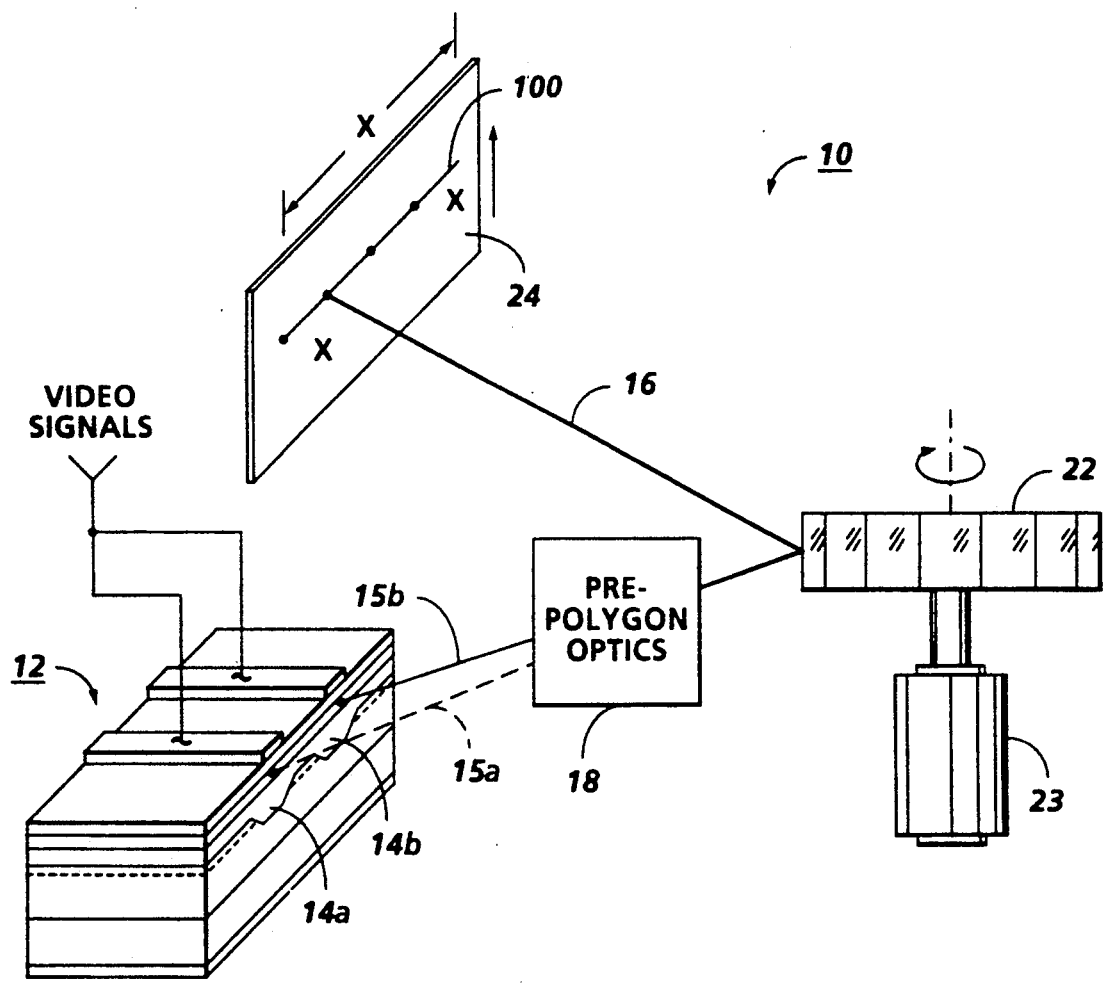
FIG. 3 is a schematic representation of an optical system incorporating a plurality of diode sources operating at different wavelengths for scanning a light beam across a scan line in a photosensitive surface.

FIG. 3 shows an imaging system 10 wherein a linear diode laser array 12 comprises a plurality of injection diode lasers. Although only two diodes 14a 14b are shown, additional diodes may be used consistent with the principles of the present invention as described in further detail below. For a given optical system, if the diodes are not sufficiently close to form essentially a single beam, then beam combining optics must be used to make the beams coincident. Lasers diodes 14a, 14b can be of the channel substrate type as disclosed in U.S. Pat. No. 4,445,125 assigned to the same patentee as the present invention whose contents are hereby incorporated by reference.

Figure 4:
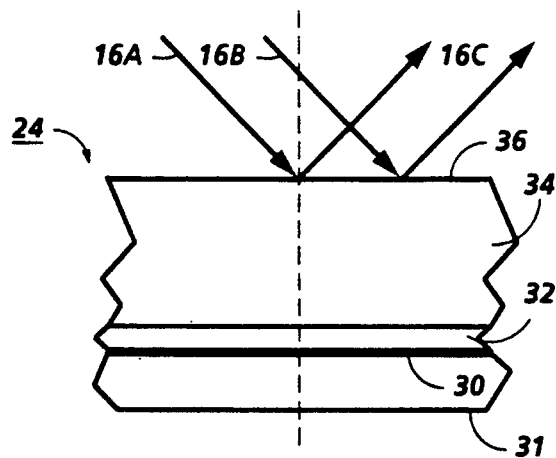
FIG. 4 is a cross-sectional view of a preferred embodiment of the photoreceptor shown in FIG. 3.

The current drive signals to the diodes are pulse modulation representations of the video signal information to be printed or copied and the diodes are driven to provide modulated output beams 15a, 15b representative of the video information. According to a first aspect of the present invention each diode is operated at its own specific characteristic wavelength. Beams 15a, 15b are collimated and focused in a prepolygon optical system 18 so that they are reflected from polygon 22 and scanned as an essentially single beam 16 in scan line x—x across photoreceptor 24. Optical system 18 may also include optical combining elements if the diodes are spaced too far apart to form the required single beam. Polygon 22 is conventionally driven by motor 23. Medium 24, in a preferred embodiment, is a layered photoreceptor shown in partial cross-sectional view in FIG. 4. The photoreceptor 24 includes a ground plane 30, formed on a dielectric substrate 31, a charge generator layer 32, and a charge transport layer 34. A photoreceptor of this type is disclosed in U.S. Pat. No. 4,588,667, whose contents are hereby incorporated by reference. According to the present invention, the merged output beam 16 having different wavelengths, and represented as rays 16a, 16b, forms a pattern at the surface 36 of photoreceptor 24 which is produced by the two rays. The wavelengths are selected to smooth out the pattern and make the absorptance in layer 32 more spatially uniform; e.g. ray 16C (FIG. 4) has nearly constant intensity (the constructive and destructive interference cancels) regardless of the thickness of layer 34. With more than two beams and two wavelengths, still more averaging of the interference pattern results, and the spatial exposure variation is minimal.

Figure 5:
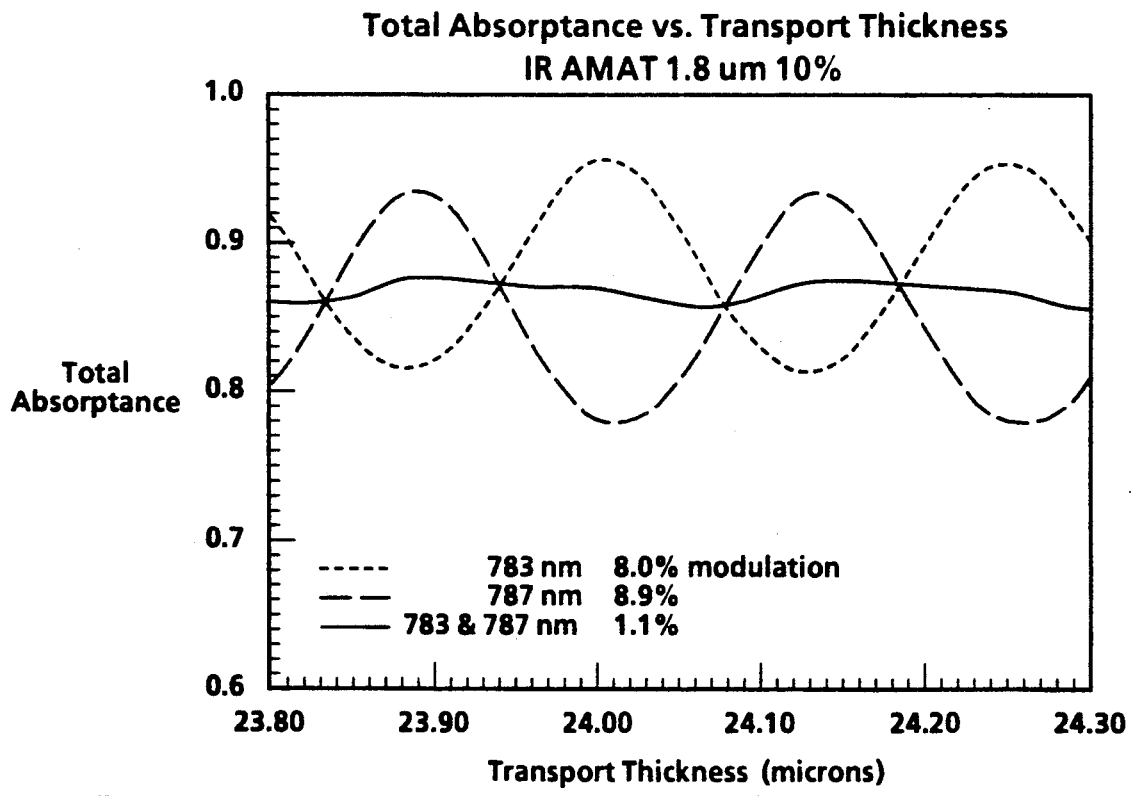
FIG. 5 shows the effect of the combined rays at the photoreceptor plotted as the absorptance throughout the layers versus the thickness of the charge transport layer of the photoreceptor.

According to a second aspect of the present invention, the wavelengths of diode lasers 14a, 14b are selected so as to minimize plywooding for some selected width of the transport layer 34. FIG. 5 shows a plot of the absorptance characteristics of beams 16a, 16b over a range of transport layer thicknesses. As an example of one optimum set of parameters, for a nominal thickness of 24 μm for layer 34, the wavelengths for beams 16a, 16b are 783 and 787 nm, respectively. At this thickness, and with these wavelengths, the absorptance maximum of the 783 nm beam coincides with the absorptance minimum of 787 nm beam canceling the modulation. The cancellation is not complete for all thicknesses, but is sufficient to reduce the plywooding effect to an almost imperceptible level.

Figure 6:
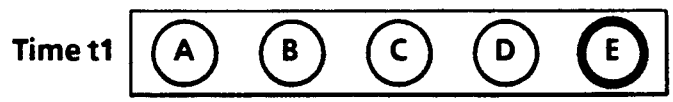
FIG. 6 shows a time sequence of the scanned beams across the photoreceptor surface when utilizing a plurality of laser diodes which are sequentially addressed.
Figure 6:
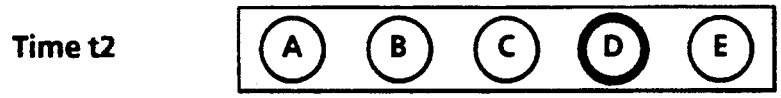
Figure 6:
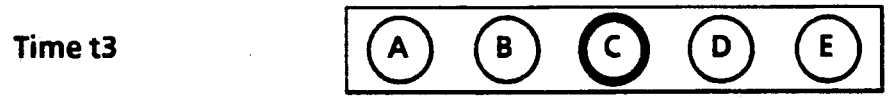
Figure 6:
Figure 6:

According to a still further aspect of the invention, it has been found that the effective exposure (or absorption) created by the rays 16a, 16b incident at the surface can be precisely defined by sequentially addressing each diode in array 12 in the following manner. A line of diodes 14a, 14b, . . . 14n would be oriented along the scan line and an image of the diode array would be swept across the photoreceptor in the scan direction (left to right in FIG. 3). By timing the turning on and off of the individual diodes in the array, a given location on the photoreceptor would be exposed by each diode in the array in sequence. Thus, at a point on the photoreceptor the exposure is like that of a single incoherent beam because the image formed on the surface would be a result of a sequence of exposures by each diode in the array, with each diode operating at preferred wavelength. FIG. 6 shows an example of a five-diode array (diodes A-E) forming images on the photoreceptor at the same location and separated in time by 1/5 pixel time $t_1$-$t_5$. Other diode times and spaces may be appropriate for certain applications. If the diodes are spaced by more than one pixel the video signal into the diodes must be phased so that the beams turn on when they are properly positioned. The photoreceptor does not move appreciably during these time intervals. The "on" time of each diode in the array is reduced by a factor equal a pixel time divided by the number of diodes in the array. Since the exposure is the sum of the exposures from each diode in the array, the rated power of the diode array must be equal to the rated power of a single diode operating in the same system. The plywood effect is reduced because each diode in the array is at a different wavelength, thus creating a different interference pattern. The number of diodes in the array, the spacing between the diodes and the differences in wavelength between the diodes can be optimized to minimize the plywood effect with the smallest number of diodes. As an example, a sequentially addressed laser diode array could be built by fabricating delay lines into the diode chip. This process would customize the chip for a given scan speed. For a 10 diode array set up to be used in a 600 spi, 10 is, 14" wide system, 90% duty cycle, with the diodes separated by 4× the FWHM of the beam waist at the diode, the delay from diode to diode would be 68 nsec. This number was arrived at by simply computing the pixel time for a system running at this speed:

Pixel time = 1/data rate = 1/((# pixels/in) × (# inches/sec) × (# inches/line)/(duty cycle))

= 1/((600 lines/inch) × (600 pixel/inch) × 10 inches/sec) × (14 inches/line)/(.9 duty cycle))

= (1/5.7 × 10⁷)sec = 17 nsec

For a diode separation of 4× the FWHM the delay time would be=4×17 nsec=68 nsec. This is not an unreasonable characteristic for a delay line.

The dual wavelength source can also be used in dual spot, or multi-spot, printing techniques of the type disclosed in U.S. Pat. No. 4,796,964. Disclosed therein is a laser diode array where the outputs from two diodes are collimated and then directed by a rotating polygon mirror assembly to form multiple scan lines on a photoreceptor drum. In this case, the plywood is not completely eliminated, but alternate raster lines are out of phase in their absorption cycles. The plywood pattern will be modulated at a high spatial frequency (half the raster frequency). This modulation will make the plywood less perceptible visually because of the high spatial frequency and because of lower contrast due to xerographic blurring. The value of this technique is in maintaining speed of printing with multiple beam scanner while still suppressing the plywood effect.

While the invention has been described with reference to the structure disclosed, it will be appreciated that numerous changes and modifications are likely to occur to those skilled in the art, and it is intended to cover all changes and modifications which fall within the true spirit and scope of the invention.

We claim:

1. A light scanning system comprising:
   a photosensitive image recording member comprising at least a transparent photoconductive charge transport layer overlying a charge generator layer and a conductive ground plane,
   a diode laser array including a plurality of diodes, each diode operating at a different output wavelength,
   means for supplying video signal information to said diodes to provide for emission of a plurality of light beams from said array with each of said light beams being modulated in accordance with said video signal information and at said different output wavelengths,
   optical means for focusing said plurality of light beams to form a merged beam at the surface of said recording member, and
   scanning means for scanning said merged beam across a linear portion of said image recording member surface, wherein the portion of the beam transmitted through the recording member and reflected from the ground plane back to the surface results in minimal spatial exposure variation at the surface due to the different absorption rates of the beam passing through the charge generator layer.

2. The light scanning system of claim 1, wherein said laser array includes two diodes each operating at a wavelength whose absorptance modulation through said transport layer effectively cancel each other.

3. The light scanning system of claim 1, wherein said plurality of diodes are individually and sequentially addressed during each scan operation with each diode forming images at the image surface at the same location for each scan.

4. The light scanning system of claim 1, wherein said diodes are adapted to form multiple scan lines at the recording member surface.

* * * * *